United States Patent [19]

Wada et al.

[11] 4,388,960
[45] Jun. 21, 1983

[54] MOTORCYCLE TIRE

[75] Inventors: Makoto Wada; Koichi Iwasaki; Hajime Nakata, all of Hiratsuka, Japan

[73] Assignee: The Yokohama Rubber Co., Ltd., Tokyo, Japan

[21] Appl. No.: 273,421

[22] Filed: Jun. 15, 1981

[30] Foreign Application Priority Data

Jun. 13, 1980 [JP] Japan .................................. 55-79725

[51] Int. Cl.³ .............................................. B60C 11/06
[52] U.S. Cl. .............................. 152/209 R; D12/145; D12/146; D12/147
[58] Field of Search .............. 152/209; D12/141, 142, D12/145, 146–147

[56] References Cited

U.S. PATENT DOCUMENTS

| D. 252,871 | 9/1979 | Gill et al. | D12/147 |
|---|---|---|---|
| 3,547,174 | 12/1970 | Mills | 152/209 R |
| 3,739,828 | 6/1973 | Schaevitz | 152/209 R |
| 3,799,230 | 3/1974 | Montagne | 152/209 R |
| 4,271,886 | 6/1981 | Bachmann et al. | 152/209 R |

FOREIGN PATENT DOCUMENTS 54-118002 9/1979 Japan .
54-124404 9/1979 Japan .

Primary Examiner—Edward C. Kimlin
Assistant Examiner—Lois E. Boland
Attorney, Agent, or Firm—Armstrong, Nikaido, Marmelstein & Kubovcik

[57] ABSTRACT

A motorcycle tire suitable for running on a road having rain grooves formed on the surface, which has a first main groove circumferentially continuously formed in a central region of the tread portion and second main grooves formed at least one run of unitary groove portions at each side of and with space from the first main groove and having interrupted portions at intervals in the circumferential direction of the tire. The first main groove comprises a plurality of groove segments and a plurality of connecting groove segments, and the groove segments, which lie circumferentially alternately at one and the other of two regions of the tread portion divided and lying closely along the center line of the tread portion and lie parallel to the center line and circumferentially successively spaced, are connected by the connecting groove segments which extend across the center line and connect together the facing ends of each two adjacent groove segments. The ratio of the interrupted portions to the pitch of repetition of unitary groove portions of the second main grooves is from 20 to 50%.

11 Claims, 11 Drawing Figures

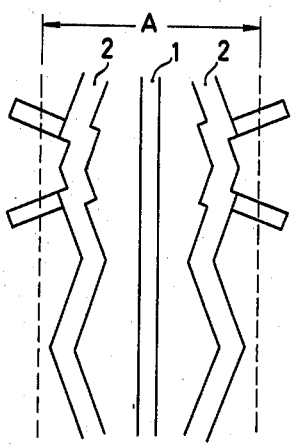
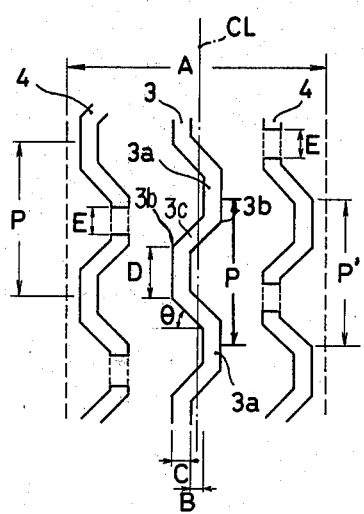
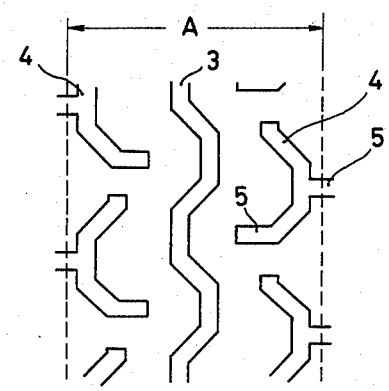

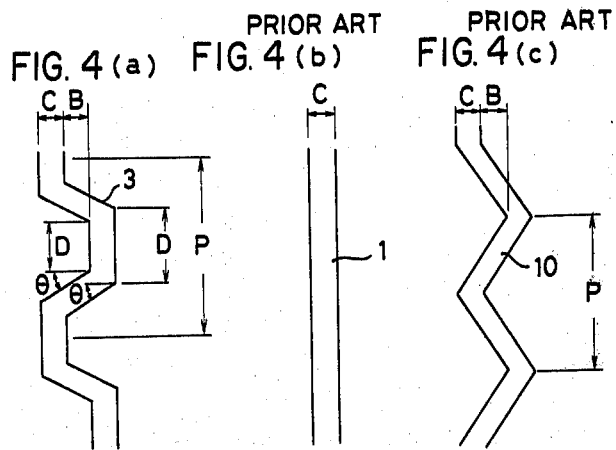
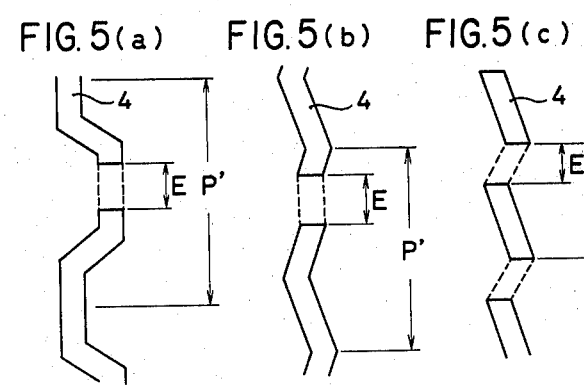
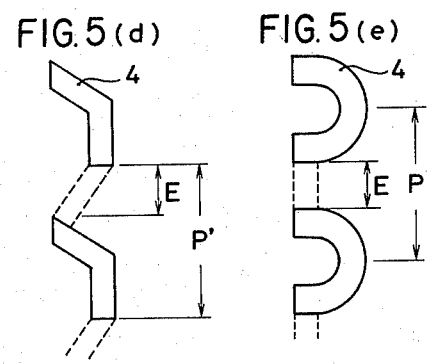

MOTORCYCLE TIRE

BACKGROUND OF THE INVENTION

1. Field of the Invention

The present invention relates to a tire for motorcycles and, more particularly, a motorcycle tire which can enhance the running stability not only on conventional ordinary roads but also on such a relatively newly developed road which has rain grooves formed on the surface, without any sacrifice caused to fundamental characteristics of the motorcycle tire such as performances under high-speed running conditions, operation characteristics under wet road conditions, and so forth of the motorcycle.

2. Description of the Prior Art

In order to secure desirable performance characteristics such as above referred to, conventional motorcycle tires are normally structured such that in a portion of the tire which contacts the ground or road surface when a motorcycle mounting the tire is run straight forward, the circumferential grooves formed in the tire tread portion comprise, for example, a first main groove which is located in a central portion of the tread portion and which is straight and circumferentially continuous, and two second main grooves which are formed one run at a side of the first main groove and which have a zigzag pattern and circumferentially continuous.

On the other hand, there have of late been such roads developed in expressways or some of ordinary roads which have a number of grooves formed on the road surface (inter-groove pitch on the order of 19 mm) in a substantially parallel arrangement along the direction in which the road runs. These grooves are called rain grooves and are provided so as to improve drain between vehicle tires and their contacting road surface when the latter is in a wet condition due to rainfall for example. When a high speed running is made with conventional motorcycle tires having the above-mentioned designed grooves, on a road having the rain grooves, there tends to occur a problem such that on account of an interaction of the rain grooves on the road surface and the circumferential grooves on the tire, the vehicle mounting the tire undergoes lateral oscillation or vibration, whereby the vehicle driver is not only given unpleasantness but also subjected to a physical danger.

SUMMARY OF THE INVENTION

It is therefore a primary object of the present invention to provide a motorcycle tire with which effectively suppressed is lateral oscillation or vibration which is likely attributable to interactions between rain grooves on the road surface and the tread pattern of the tire, in directions substantially at a right angle to the direction in which a vehicle or motorcycle having the tire mounted thereon advances.

To attain the above and other objects which will become more apparent as the description proceeds, the motorcycle tire according to the present invention is characterized essentially as follows:

That is to say, the tire has such circumferential grooves on the tread portion which comprise a first main groove which is circumferentially continuously formed in a central region of the tread and second main grooves formed at least one run of unitary groove portions at each side of and with space from the first main groove, wherein the first main groove comprises a plurality of groove segments disposed circumferentially alternately at one and the other of two regions of the tread portion divided along the center line of the tread portion, parallel to the above-mentioned center line and successively spaced in the circumferential direction of the tire, and also a plurality of connecting groove segments disposed to run across the center line of the tread portion and connect together facing ends of each adjacent two of the above alternately disposed groove segments in a manner of forming a continuous groove with the groove segments and the connecting groove segments along the circumference of the tire, whereby the tire can effectively suppress oscillation likely to occur in lateral directions or in directions substantially perpendicular to the direction in which the vehicle is run, as a result of an interaction of rain grooves on a road surface and a tread pattern of a tire.

With the second main grooves, further, their unitary groove members or portions in one side of the first main groove and in the other side thereof are arranged with a phase difference in the circumferential direction of the tire.

BRIEF DESCRIPTION OF THE DRAWINGS

FIG. 1 shows a view taken for illustration of circumferential groove within that region of the tread portion of a conventional tire which contacts the ground or road surface when a motorcycle bearing the tire is run straight forward;

FIG. 2 is a view showing an essential portion of a tire according to a first embodiment of the present invention;

FIG. 3 is a view similar to FIG. 2, showing a second embodiment of the present invention;

FIG. 4 (a) shows a groove configuration for the first main groove of a tire according to the present invention;

FIGS. 4 (b) and 4 (c) respectively show one and another examples of the first main groove in conventional tires; and FIGS. 5 (a) through 5 (e) respectively show a groove configuration for the second main grooves in tires according to the present invention.

DETAILED DESCRIPTION OF THE PREFERRED EMBODIMENTS

The illustration in FIG. 1 represents an example of conventional motorcycle tires, and as illustrated, in that region which contacts the ground or road surface when a motorcycle mounting the tire is straight forwardly driven, namely the road contacting region or face indicated at A, the tire has a first main groove 1 which is straight linear and continuous in the circumferential direction of the tire, and at each side of and with a space from the first main groove, a second main groove 2 which also is continuous in the circumferential direction and takes a zigzag pattern. With a tire having in the road contacting face A a plurality of circumferentially continuous grooves as in the above referred to conventional tire, it may be mounted on a motorcycle and the latter may be driven on a road having rain grooves formed on the surface, and then it tends to occur that the interaction between the rain grooves and the grooves on the tire becomes promoted enough great to cause the running motorcycle to oscillate or vibrate a considerable extent in lateral directions virtually perpendicular to the running direction of the motorcycle.

The present invention is to eliminate the possibility to such difficulty with conventional motorcycle tires, and to this end, in the motorcycle tire of a first embodiment of the invention which is illustrated in FIG. 2, a circumferentially continuous first main groove 3 is provided in the road contacting face A, together with second main groove 4 which are provided at least one run of unitary groove portions or members at each side of the first main groove 3 with a space from the latter and each of which is discontinued at suitable intervals along the circumference of the tire and thus comprises a plurality of discontinued but linearly arranged unitary groove portions or members.

The first main groove 3 includes a plurality of groove segments 3a which are circumferentially alternately disposed at one and the other of two regions closely along the respective side of the center line CL of the tread portion. These groove segments 3a extend parallel to the center line CL and each adjacent two of them are connected to each other at their facing ends 3b by a connecting groove segment 3c, which the first main groove also includes and which extends across the center line CL between the above-mentioned one and the other of two regions divided by the center line CL. The arrangement is such that a groove segment 3a at one of the two regions is connected at its ends to adjacent groove segments 3a on the other of the regions by connecting groove segments 3c to altogether form a continuous groove around the circumference of the tire. That is to say, the first main groove 3 consists of a plurality of substantially trapezoidal unitary grooves which individually correspond to an aggregation of a groove segment 3a and two connecting groove segments 3c and which altogether are connected in a continuous run.

The second main groove 4 includes interrupted or discontinued portions of a length E at suitable intervals along the circumference of the tire, whereby it comprises a plurality of unitary groove members or portions, and the unitary groove member substantially resembles the unitary groove of the first main groove 3, in configuration, that is, it is formed substantially in a trapezoidal configuration.

The unitary groove members or portions of the second main groove 4, which typically are provided in two circumferential runs, one at each side of the first main groove, are in this case arranged with a phase difference between one run and the other in the circumferential direction of the tire.

The ratio of the length E of the interrupted portion to the pitch of repetition of unitary groove members of the second main grooves 4, P', may be set at 20 to 50% and, more preferably, 20 to 40%. At a ratio below 20%, the effect will not be exhibited of sufficiently suppressing the undesirable vibration or oscillation likely to occur when a motorcycle bearing the tire is run on a rain-groove formed road, substantially at a right angle to the running direction, and at a value of the ratio exceeding 50%, the drain performance will be impaired.

Of the groove segments 3a and the connecting groove segments 3c constituting the first main groove 3, a preferred dimensional specification is as follows:

Lapping width of ribs at the sides of grooves, B: 0–14 mm
Groove width, C: 3–7 mm
Pitch length of unitary grooves, P: 20–60 mm
Length of the groove segment, D: 7–25 mm
Angle of inclination of the connecting groove segments to the normal to the center line, $\theta$: 0°–45°

If the first main groove 3 does not comprise a straight linear configuration but comprises, as described above, a plurality of trapezoidal unitary grooves altogether continuously connected in the circumferential direction, a motorcycle tire can be relatively free of an influence of rain grooves on the road surface. Also, with a tire in which the ratio of the length E of the interrupted portion of the second main grooves 4 to the pitch P' of repetition of unitary groove members of the same grooves 4 is within the range of from 20 to 50%, avoidable at a considerable degree is the phenomenon of promotion of the interaction between rain grooves and each groove on the tire. Thus, in accordance with the present invention, vibrations or oscillations otherwise likely to become caused during running of a motorcycle on a road formed with rain grooves can be suppressed to minimum.

The above can be more clearly appreciated from considering results of running tests, which will now be described:

Initially entered will be an explanation on the result of tests conducted in connection with such first main grooves as shown in FIGS. 4 (a) through 4 (c). The groove 3 is FIG. 4 (a) represents the above described embodiment of the present invention. The groove 1 in FIG. 4 (b) corresponds to the groove of the prior art tire shown in FIG. 1, which comprises a so-called straight linear groove having no angled portion in the circumferential direction of the tire. FIG. 4 (c), which also represents a prior art tire, shows a groove 10, which has a certain angle to the circumferential direction of the tire and comprises a so-called zigzag groove comprising segments laterally bent at a constant pitch. Where applicable in FIGS. 4 (a) to 4 (c), reference characters B, C, P, D and $\theta$ denote respectively the lapping width of ribs at the sides of grooves, the width of the groove, the pitch length of the unitary grooves, the length of the groove segment 3a according to the invention, and the angle of inclination of the connecting groove segments 3c to the normal to the center line of the tread portion. With the factors B, C, P, D and $\theta$ set respectively at 0–14 mm, 3–7 mm, 20–60 mm, 7–25 mm and 0°–45°, a variety of tires separately having main grooves shown in FIGS. 4 (a) to 4 (c) were built, and with respective tires, running tests were carried out on a road formed with rain grooves at 19 mm pitch of grooves to obtain results as entered in the below recited Table 1. Further, vibrations or oscillations generated in lateral directions were determined in terms of lateral acceleration values and in the Table 1 a comparison is made of the values found with the value found in the case of FIG. 4 (b) taken as 100.

TABLE 1

| Groove Configuration | Lateral Acceleration Ratio (%) |
|---|---|
| FIG. 4 (b) | 100 |
| FIG. 4 (c) | 60–90 |
| FIG. 4 (a) | 30–70 |

As clearly seen from the above recited test results, the vibration value is smaller with the tire having the first main groove of FIG. 4 (a) according to the present invention than with each of the tires having grooves as shown in FIGS. 4 (b) and 4 (c).

Then, in connection with the second main grooves 4 formed at the sides of and with spaces from the first main groove 3, a consideration will be given the relation between the configuration of the groove and the lateral oscillations during running on a road having rain grooves formed on the surface.

A variety of tires were built, of which the second main grooves were varied among those shown in FIGS. 5 (a) through 5 (e) which were formed one run at each side of and with a space from the first main groove conforming to the illustration in FIG. 4 (a), and of which the ratio of the interrupted length E to the pitch P' of repetition of the unitary groove portions of the second main grooves was within the range of 20 to 50%. Also built were further tires which had the same arrangement as above of the first and the second main grooves except that the second main grooves were devoid of the interrupted portion and comprised continuous runs of unitary groove members or portions. Of the respective tires, running tests were conducted on a road with rain grooves formed at a groove pitch of 19 mm to find that with the tires having interruptions in the second main grooves, the oscillations or vibrations in lateral directions were reduced to 50–80% of the values found of the other tires having no interruptions in the second main grooves.

The undermentioned Table 2 enters the result of running tests conducted on a road having rain grooves at 19 mm groove pitch in connection with a tire (1) formed with the alone of a straight linear first main groove in the center of the ground or road contacting portion of the tread, the prior art tire (2) having the first main groove 1 and second main grooves 2 shown in FIG. 1 and also a tire (3) according to the above described first embodiment of the present invention.

As in the case of the above considered Table 1, lateral vibrations generated during running on the rain-groove provided road were determined in terms of lateral acceleration values, and in the Table 2 a comparison of the found values is entered with the value in the case of tire (1) taken as 100.

TABLE 2

| Tires | Lateral Acceleration Ratio (%) |
| --- | --- |
| (1) | 100 |
| (2) | 90–180 |
| (3) | 40–70 |

Test results above recited clearly show that the lateral vibration was remarkably suppressed with the tire according to the present invention in clear contrast against the other tires.

It is also clearly shown that substantially no change arises in the effect of the present invention if the configuration of the second main grooves 4 is trapezoidal as shown in FIGS. 5 (a) and 5 (d), or if it is in a saw-blade shape as shown in FIGS. 5 (b) and 5 (c) or in a semicircular shape as shown in FIG. 5 (e). That is to say, the second main grooves 4 can be of any optional shape.

FIG. 3 illustrates a second embodiment of the present invention, and the tire of this embodiment has auxiliary grooves 5 which are laterally extended from the second main grooves 5 as shown so as thereby to further improve the drain characteristic and accordingly the operation characteristics under wet road conditions. It will be readily understood that if necessary, the lateral auxiliary grooves 5 may be provided to the first main groove 3.

Solely for the purpose of making the tire less sensitive to influence of rain grooves, it may well be recommended that similar to the second main grooves 4, the first main groove 3, too, has interrupted or discontinued portions. However, this is not preferred because if it is so made, then the drain characteristic of the tire will become considerably impaired.

As described in detail above, according to the present invention circumferential grooves in that area or region of the motorcycle tire which contacts the ground or road surface during straight forward running are made having such particular configurations as above described in connection with specific embodiments of the invention, so that a remarkable suppression can be realized of lateral vibrations or oscillations which can take place attributable to interactions between rain grooves on the road surface and grooves on the tire and in directions substantially perpendicular to the direction in which running is made.

Accordingly, the present invention can enhance the running stability not only on ordinary roads but also on rain-groove formed roads, without sacrificing at all the fundamental tire characteristics such as tire performances under high-speed driving conditions, operation characteristics under wet road conditions and so forth.

What is claimed is:

1. A motorcycle tire having a first main groove circumferentially continuously formed in a central region of the tread portion and second main grooves formed of at least one run of unitary groove portions at each side of and with a space from said first main groove and having interrupted portions circumferentially at intervals to make the second main groove comprising unitary groove portions, said first main groove comprising a plurality of groove segments disposed circumferentially altenately at one and the other of two regions of the tread portion divided and lying close along the center line of the tread portion, said plurality of groove sections lying parallel to said center line and successively spaced in the circumferential direction of the tire, and a plurality of connecting groove segments extending across said center line and connecting together each adjacent two of said groove segments at their facing ends, the ratio of length of said interrupted portions to the pitch of repetition of said unitary groove portions being within the range of from 20 to 50%.

2. A motorcycle tire as claimed in claim 1, wherein said first main groove comprises a plurality of substantially trapezoidal unitary grooves altogether connected to a circumferentially continuous run.

3. A motorcycle tire as claimed in claim 1, wherein each of said unitary groove portions of the second main grooves is of substantially trapezoidal configuration.

4. A motorcycle tire as claimed in claim 2, wherein each of said unitary groove portions of the second main grooves is of a substantially trapezoidal configuration.

5. A motorcycle tire as claimed in claim 1, wherein each of said unitary groove portions of the second main grooves is substantially of a saw-blade configuration.

6. A motorcycle tire as claimed in claim 2, wherein each of said unitary groove portions of the second main grooves is substantially of a saw-blade configuration.

7. A motorcycle tire as claimed in claim 1, wherein each of said unitary groove portions of the second main grooves is of a substantially semi-circular configuration.

8. A motorcycle tire as claimed in claim 2, wherein each of said unitary groove portions of the second main grooves is of a substantially semi-circular configuration.

9. A motorcycle tire as claimed in claim 3, wherein said second main grooves are formed with auxiliary grooves extending in the direction substantially perpendicular to said center line of the tread portion.

10. A motorcycle tire as claimed in claim 4, wherein said second main grooves are formed with auxiliary grooves extending in the direction substantially perpendicular to said center line of the tread portion.

11. A motorcycle tire as claimed in claim 1, wherein said groove segments and said connecting groove segments constituting said first main groove have the following dimensional specification:

the lapping width of ribs at the sides of groove segments: 0–14 mm;

the width of the groove segments and the connecting groove segments: 3–7 mm;

the pitch length of a unitary groove comprising two groove segments and two connecting groove segments: 20–60 mm;

the length of the groove segments: 7–25 mm; and the angle of inclination of the connecting groove segments to the normal to the center line of the tread portion: 0°–45°.

* * * * *